United States Patent
Yu et al.

(10) Patent No.: US 12,477,032 B2
(45) Date of Patent: Nov. 18, 2025

(54) DATA PROCESSING METHOD, EXECUTION WORKSTATION, DISTRIBUTED COMPUTING SYSTEM, AND STORAGE MEDIUM

(71) Applicant: TSINGHUA UNIVERSITY, Beijing (CN)

(72) Inventors: Bowen Yu, Beijing (CN); Wenguang Chen, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 24 days.

(21) Appl. No.: 18/576,856

(22) PCT Filed: Jul. 6, 2022

(86) PCT No.: PCT/CN2022/104127
§ 371 (c)(1),
(2) Date: Jan. 5, 2024

(87) PCT Pub. No.: WO2023/280207
PCT Pub. Date: Jan. 12, 2023

(65) Prior Publication Data
US 2024/0291886 A1 Aug. 29, 2024

(30) Foreign Application Priority Data
Jul. 7, 2021 (CN) .......................... 202110766780.0

(51) Int. Cl.
*H04L 67/10* (2022.01)
(52) U.S. Cl.
CPC .................... *H04L 67/10* (2013.01)
(58) Field of Classification Search
CPC ......... H04L 67/10; H04L 41/16; G06N 20/00; G06N 20/10; G06N 20/20; G06N 7/00
(Continued)

(56) References Cited

U.S. PATENT DOCUMENTS

| | | | |
|---|---|---|---|
| 9,753,807 B1* | 9/2017 | Donlan | ............... G06F 11/1076 |
| 2014/0149558 A1* | 5/2014 | Quan | ...................... H04L 65/60 |
| | | | 709/219 |

(Continued)

OTHER PUBLICATIONS

Tang et al., "A Survey on Spark Ecosystem: Big Data Processing Infrastructure, Machine Learning, and Applications", 2020, IEEE, IEEE Transactions on Knowledge and Data Engineering ( vol. 34, Issue: 1, Jan. 1, 2022), ieeexplore.ieee.org/document/9007378 (Year: 2020).*

(Continued)

*Primary Examiner* — Ruolei Zong
(74) *Attorney, Agent, or Firm* — Scully, Scott, Murphy & Presser, P.C.

(57) ABSTRACT

A data processing method, an execution workstation, a distributed computing system and a computer-readable storage medium. The method includes: splitting an aggregate into a plurality of aggregate fragments; sending a first portion of aggregate fragments to a first execution workstation to perform reduction on the first execution workstation; receiving, from a second execution workstation, aggregate fragments produced by the second execution workstation and corresponding to a second portion of aggregate fragments and performing reduction on the aggregate fragments received and the second portion of aggregate fragments to update the second portion of aggregate fragments; re-determining a new first portion of aggregate fragments and a new second portion of aggregate fragments from a remaining portion excluding the first portion of aggregate fragments that have been sent from the plurality of aggregate fragments, and performing the sending, receiving and reduction; sending the aggregate fragment completing all reduction to a management workstation.

20 Claims, 7 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 2016/0269801 | A1* | 9/2016 | Harden | H04L 65/70 |
| 2017/0161439 | A1* | 6/2017 | Raduchel | G16H 10/60 |
| 2019/0205745 | A1* | 7/2019 | Sridharan | G06N 3/04 |
| 2020/0241759 | A1* | 7/2020 | Danilov | G06F 3/0605 |
| 2023/0118948 | A1* | 4/2023 | Crofton | H04L 67/561 |
| | | | | 709/223 |

OTHER PUBLICATIONS

Mohammadreza Bayatpour et al., "Scalable Reduction Collectives with Data Partitioning-based Multi-Leader Design", 2017, IEEE, SC17: International Conference for High Performance Computing, Networking, Storage and Analysis, https://ieeexplore.ieee.org/document/9926237 (Year: 2017).*

Yu, B. et al., "Sparker: Efficient Reduction for More Scalable Machine Learning with Spark", 50th International Conference on Parallel Processing, Oct. 5, 2021, pp. 4-7.

* cited by examiner

DATA PROCESSING METHOD, EXECUTION WORKSTATION, DISTRIBUTED COMPUTING SYSTEM, AND STORAGE MEDIUM

CROSS-REFERENCE TO RELATED APPLICATION

The present disclosure is a U.S. National Phase Entry of International Patent Application No. PCT/CN2022/104127, filed on Jul. 6, 2022, which claims priority of the Chinese Patent Application No. 202110766780.0, filed on Jul. 7, 2021, the entire disclosure of each of which is incorporated herein by reference as part of the present disclosure.

TECHNICAL FIELD

Embodiments of the present disclosure relate to a data processing method, an execution workstation, a distributed computing system and a computer-readable storage medium.

BACKGROUND

Now, in the data era, data informatization is closely related to people's lives and works. With the sharp increase of the data volume, a single machine is difficult to process data. Therefore, distributed computing is designed for the big data processing framework. Spark is one of most popular big data processing frameworks. Spark connects various data analysis domains via its elastic distributed data set programming model. A machine learning framework MLlib of Spark is widely used, because MLlib can be easily integrated into Spark's data analysis workflow. Tree aggregation is an important research hotspot of MLlib, and tree aggregation in Spark can be roughly divided into two continuous steps: calculation and reduction. In the calculation step, a value of a current partition is calculated locally. In the reduction step, the calculated values (called aggregates) are further globally reduced to a single aggregate.

SUMMARY

At least one embodiment of the present disclosure provides a data processing method for distributed computing executed by an execution workstation, which includes: splitting an aggregate of a pre-determined data format into a plurality of aggregate fragments; sending a first portion of aggregate fragments among the plurality of aggregate fragments to another execution workstation to perform reduction on the another execution workstation; receiving, from further another execution workstation, aggregate fragments produced by the further another execution workstation and corresponding to a second portion of aggregate fragments among the plurality of aggregate fragments and performing reduction on the aggregate fragments received and the second portion of aggregate fragments to update the second portion of aggregate fragments, the first portion being different from the second portion; re-determining a first portion of aggregate fragments and a second portion of aggregate fragments from a remaining portion excluding the first portion of aggregate fragments that have been sent from the plurality of aggregate fragments, and performing the sending, receiving and reduction until each of the plurality of aggregate fragments is sent or completes all reduction; and in the case that there is an aggregate fragment completing all reduction, sending the aggregate fragment completing all reduction to a management workstation for the management workstation to splice the aggregate fragment completing all reduction with other aggregate fragments completing all reduction into an aggregate.

For example, in the data processing method provided in at least one embodiment of the present disclosure, the number of aggregate fragments into which the aggregate is split is equal to the number of execution workstations participating in aggregation; and the number of the first portion of aggregate fragments and the number of the second portion of aggregate fragments are one respectively.

For example, in the data processing method provided in at least one embodiment of the present disclosure, the number of aggregate fragments into which the aggregate is split is equal to the number of execution workstations participating in aggregation multiplied by a number of parallel communication lines of each of the execution workstations; and the number of the first portion of aggregate fragments and the number of the second portion of aggregate fragments are respectively the number of parallel communication lines of each of the execution workstations.

For example, in the data processing method provided in at least one embodiment of the present disclosure, the first portion of aggregate fragments which is re-determined in the remaining portion excluding the first portion of aggregate fragments that have been sent from the plurality of aggregate fragments is the second portion of aggregate fragments which is updated in a previous round of receiving and reduction.

At least one embodiment of the present disclosure provides an execution workstation for distributed computing, which includes a processor and a memory. The memory stores one or more computer program instructions, the one or more computer program instructions are stored in the memory, and, upon being executed by the processor, implement the data processing method provided by at least one embodiment of the present disclosure.

At least one embodiment of the present disclosure provides a data processing method executed by a distributed computing system, the distributed computing system includes a plurality of execution workstations and a management workstation, and the data processing method includes: each of the plurality of execution workstations executing following steps: splitting an aggregate of a pre-determined data format into a plurality of aggregate fragments; sending a first portion of aggregate fragments among the plurality of aggregate fragments to another execution workstation to perform reduction on the another execution workstation; receiving, from further another execution workstation, aggregate fragments produced by the further another execution workstation and corresponding to a second portion of aggregate fragments among the plurality of aggregate fragments and performing reduction on the aggregate fragments received and the second portion of aggregate fragments, to update the second portion of aggregate fragments, the first portion being different from the second portion; re-determining a first portion of aggregate fragments and a second portion of aggregate fragments from a remaining portion excluding the first portion of aggregate fragments that have been sent from the plurality of aggregate fragments, and executing the sending, receiving and reduction until each of the plurality of aggregate fragments is sent or completes all reduction; and in the case that there is an aggregate fragment completing all reduction, sending the aggregate fragments completing all reduction to the management workstation; and the management workstation receiving aggregate fragments completing all reduction sent by the plurality of execution workstations and splicing the aggregate fragments received into an aggregate.

For example, in the data processing method provided in at least one embodiment of the present disclosure, the number of aggregate fragments into which the aggregate is split is equal to the number of the plurality of execution workstations; and the number of the first portion of aggregate fragments and the number of the second portion of aggregate fragments are one respectively.

For example, in the data processing method provided in at least one embodiment of the present disclosure, the number of the plurality of execution workstations is N, and the plurality of execution workstations are sequentially numbered as 0, 1, . . . i, . . . and N−1; the number of the plurality of aggregate fragments is N, and the plurality of aggregate fragments are sequentially numbered as 0, 1, . . . i, . . . and N−1; the plurality of execution workstations perform the sending, receiving and reduction as follows: step one: letting j=N−1; step two: for i=0 to N−1, an i-th execution workstation sending a (i+j+1)-th aggregate fragment of the i-th execution workstation to an (i+1)-th execution workstation, and receiving an (i+j)-th aggregate fragment from an (i−1)-th execution workstation and performing reduction, where in the case that i−1<0, i−1 is replaced by i+N−1; in the case that i+j>N−1, i+j is replaced by i+j−N; in the case that i+j+1>N−1, i+j+1 is replaced by i+j+1−N; in the case that j>1, subtracting 1 from a value of j and performing the step two; and step three: for i=0 to N−1, the i-th execution workstation sending an (i+1)-th aggregate fragment to the management workstation, in the case that i+1=n, i+1 being replaced by 0.

For example, in the data processing method provided in at least one embodiment of the present disclosure, the number of aggregate fragments into which the aggregate is split is equal to the number of the plurality of execution workstations multiplied by the number of parallel communication lines of each of the plurality of execution workstations; and the number of the first portion of aggregate fragments and the number of the second portion of aggregate fragments are respectively the number of parallel communication lines of each of the plurality of execution workstations.

At least one embodiment of the present disclosure provides a distributed computing system, which includes a plurality of execution workstations and a management workstation. Each of the plurality of execution workstations is configured to: split an aggregate of a pre-determined data format into a plurality of aggregate fragments; send a first portion of aggregate fragments among the plurality of aggregate fragments to another execution workstation to perform reduction on the another execution workstation; receive, from further another execution workstation, aggregate fragments produced by the further another execution workstation and corresponding to a second portion of aggregate fragments among the plurality of aggregate fragments and perform reduction on the aggregate fragments received and the second portion of aggregate fragments to update the second portion of aggregate fragments, the first portion being different from the second portion; re-determine a first portion of aggregate fragments and a second portion of aggregate fragments from a remaining portion excluding the first portion of aggregate fragments that have been sent from the plurality of aggregate fragments, and perform the sending, receiving and reduction until each of the plurality of aggregate fragments is sent or completes all reduction; and in the case that there is an aggregate fragment completing all reduction, send the aggregate fragment completing all reduction to the management workstation; and the management workstation is configured to receive aggregate fragments completing all reduction sent by the plurality of execution workstations, and splice the aggregate fragments received into an aggregate.

At least one embodiment of the present disclosure provides a computer-readable storage medium, which stores computer-readable instructions in a non-transitory manner, the computer-readable instructions, upon being executed by a processor, implement the data processing method provided by at least one embodiment of the present disclosure.

According to the data processing method, the execution workstation, the distributed computing system and the computer-readable storage medium of embodiments of the present disclosure, the aggregate can be split and reduced to improve the parallelism of data aggregation, thereby improving the processing performance.

BRIEF DESCRIPTION OF DRAWINGS

To more clearly illustrate the embodiments of the present disclosure, the drawings required to be used for the embodiments are briefly described in the following. It is obvious that the drawings described below are only some embodiments of the present disclosure and are not a limitation of the present disclosure.

DETAILED DESCRIPTION

Figure 1:
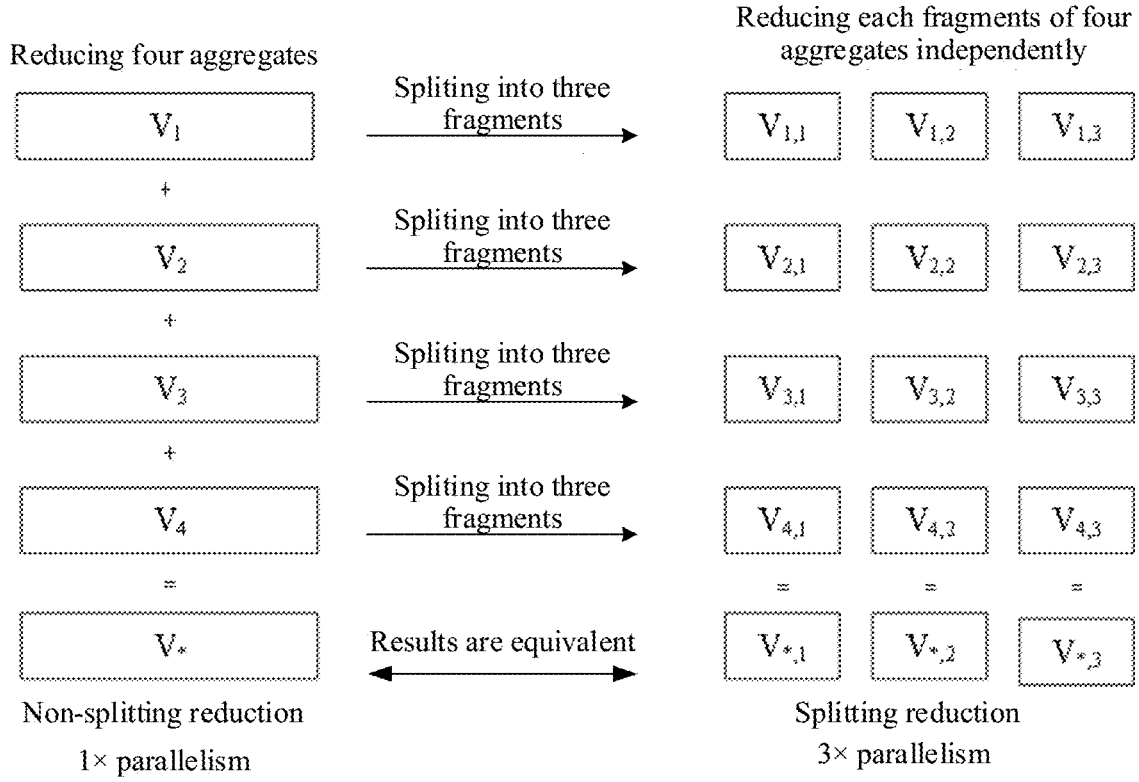
FIG. 1 shows a comparative schematic diagram between splitting reduction and non-splitting reduction provided by at least one embodiment of the present disclosure.

In order to make objects, technical details and advantages of the embodiments of the present disclosure apparent, the technical solutions of the embodiments are described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by those of ordinary skill in the art to which the present disclosure belongs. The terms "first", "second", and the like, which are used in the description and the claims of the present disclosure, are not intended to indicate any sequence, amount or importance, but used to distinguish various components. Similarly, the terms "a", "an", "the", or the like are not intended to indicate a limitation of quantity, but indicate that there is at least one. The terms, such as "comprise/comprising", "include/including", or the like are intended to specify that the elements or the objects stated before these terms encompass the elements or the objects and equivalents thereof listed after these terms, but not preclude other elements or objects. The terms, such as "connect/connecting/connected", "couple/coupling/coupled", or the like, are not limited to a physical connection or mechanical connection, but may include an electrical connection/coupling, directly or indirectly. The terms, "on", "under", "left", "right", or the like are only used to indicate relative position relationship, and when the position of the object which is described is changed, the relative position relationship may be changed accordingly.

MLlib has poor scalability, and its bottleneck lies in a reduction step in tree aggregation. A scalable reduction algorithm (for example, a Rabenseifner reduction algorithm) has better performance than the tree aggregation. However, the non-splittable object interface in Spark lacks an object splitting function, so MLlib does not support the scalable reduction algorithm. Therefore, the inventors design a new technical solution capable of splitting an object to obtain more parallelism, thus being applicable to the scalable reduction algorithm.

At least one embodiment of the present disclosure provides a data processing method, an execution workstation, a distributed computing system and a computer-readable storage medium. For example, the data processing method is used for distributed computing and executed by an execution workstation. The data processing method may include: splitting an aggregate of a pre-determined data format into a plurality of aggregate fragments; sending a first portion of aggregate fragments among the plurality of aggregate fragments to another execution workstation to perform reduction on the another execution workstation; receiving, from further another execution workstation, aggregate fragments produced by the further another execution workstation and corresponding to a second portion of aggregate fragments among the plurality of aggregate fragments and performing reduction on the aggregate fragments received and the second portion of aggregate fragments to update the second portion of aggregate fragments, the first portion being different from the second portion; re-determining a first portion of aggregate fragments and a second portion of aggregate fragments from a remaining portion excluding the first portion of aggregate fragments that have been sent from the plurality of aggregate fragments, and performing the sending, receiving and reduction until each of the plurality of aggregate fragments is sent or completes all reduction; and in the case that there is an aggregate fragment completing all reduction, sending the aggregate fragment completing all reduction to a management workstation for the management workstation to splice the aggregate fragment completing all reduction with other aggregate fragments completing all reduction into an aggregate.

The data processing method of this embodiment can split the object to be reduced into small blocks (fragments) for separate reduction to achieve higher parallelism, thus improving the processing performance, and thus being applicable to the scalable reduction algorithm.

It should be noted that the big data processing framework includes but is not limited to Spark, and the data processing method provided by at least one embodiment of the present disclosure may also be applied to other big data processing frameworks.

The distributed computing system provided by at least one embodiment of the present disclosure may include a management workstation, an execution workstation and an internal memory. The execution workstation is a computing device that processes tasks in the distributed computing system. For example, the execution workstation can run an executor in a Spark architecture. The management workstation is a computing device responsible for managing the execution workstations in the distributed computing system. For example, the management workstation can run a driver in the Spark architecture, and the management workstation can coordinate, schedule and monitor tasks of each execution workstation. Task results of the execution workstations can finally be summarized into the management workstation. The management workstation interacts with a plurality of execution workstations through a communication network, and the execution workstation interact with other execution workstations through the communication network to receive or send messages. The communication network is used to provide a medium for communication links between the management workstation and the plurality of execution workstations, and between the plurality of execution workstations. The communication network may include various connection types, for example, wired or wireless communication links, specifically, such as WIFI, 3G, 4G, 5G and fiber optic cables.

In the embodiment of the present disclosure, reduction represents merging two or more items of data, and a total data volume after merging is smaller than that before merging. For example, two or more items of data can be summed or the like. An aggregate represents a data unit of a pre-determined data format, which can be used for aggregation (merging) or other calculations. A pre-determined data structure can be determined in advance according to a specific application, and, for example, can be an array or other data structures defined by the user.

FIG. 1 shows a comparative schematic diagram between splitting reduction and non-splitting reduction provided by at least one embodiment of the present disclosure.

As shown in FIG. 1, both reduction processes shown on left and right sides of the schematic diagram show that a plurality of aggregates are reduced to one aggregate. The left side of the schematic diagram shows non-splitting reduction, and the right side of the schematic diagram shows splitting reduction.

Four aggregates $V_1$, $V_2$, $V_3$ and $V_4$ in FIG. 1 are reduced to one aggregate. The non-splitting reduction regards the aggregate as a non-splittable object, and directly reduces $V_1$, $V_2$, $V_3$ and $V_4$ to $V_*$. For the splitting reduction, each aggregate $V_i$ (i=1, 2, 3, 4) is splitable and each aggregate $V_i$ (i=1, 2, 3, 4) can be split into three fragments $V_{i,1}$, $V_{i,2}$, $V_{i,3}$, for example. First fragments $V_{1,1}$, $V_{2,1}$, $V_{3,1}$, $V_{4,1}$ of the aggregate $V_i$ (i=1, 2, 3, 4) belong to a group. Similarly, second fragments $V_{1,2}$, $V_{2,2}$, $V_{3,2}$, $V_{4,2}$ belong to a group, and third fragments $V_{1,3}$, $V_{2,3}$, $V_{3,3}$, $V_{4,3}$ belong to a group. Each group of fragments may be reduced independently to form results $V_{*,1}$, $V_{*,2}$, $V_{*,3}$ respectively. Compared with the non-splitting reduction, the splitting reduction achieves three times of parallelism, so that the processing performance is improved.

Figure 2A:
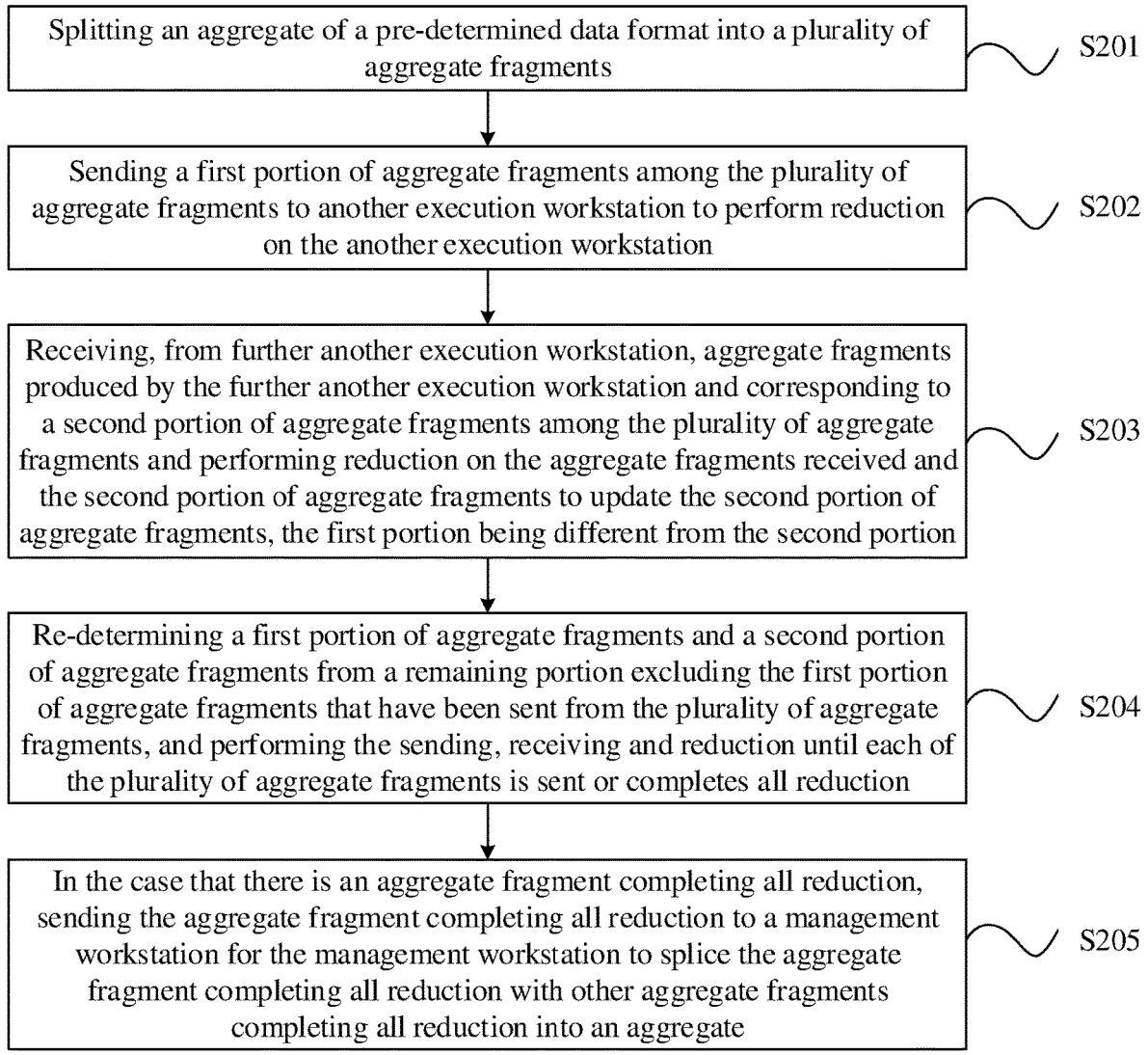
FIG. 2A shows a flowchart of a data processing method for distributed computing executed by an execution workstation provided by at least one embodiment of the present disclosure.

FIG. 2A shows a flowchart of a data processing method for distributed computing executed by an execution workstation provided by at least one embodiment of the present disclosure.

As shown in FIG. 2A, the data processing method includes steps S201 to S205.

Steps S201-S205 are executed by the execution workstation.

Step S201: splitting an aggregate of a pre-determined data format into a plurality of aggregate fragments.

Step S202: sending a first portion of aggregate fragments among the plurality of aggregate fragments to another execution workstation to perform reduction on the another execution workstation.

Step S203: receiving, from further another execution workstation, aggregate fragments produced by the further another execution workstation and corresponding to a second portion of aggregate fragments among the plurality of aggregate fragments and performing reduction on the aggregate fragments received and the second portion of aggregate fragments to update the second portion of aggregate fragments, the first portion being different from the second portion.

Step S204: re-determining a first portion of aggregate fragments and a second portion of aggregate fragments from a remaining portion excluding the first portion of aggregate fragments that have been sent from the plurality of aggregate fragments, and performing the sending, receiving and reduction (i.e., steps S202 and S203) until each of the plurality of aggregate fragments is sent or completes all reduction.

Step S205: in the case that there is an aggregate fragment completing all reduction, sending the aggregate fragment completing all reduction to a management workstation for the management workstation to splice the aggregate fragment completing all reduction with other aggregate fragments completing all reduction into an aggregate.

For step S201, the aggregate is usually a data unit for data aggregation or reduction, and its data format can be determined in advance according to a specific application, and, for example, can be an array or other data structures defined by the user. In an embodiment of the present disclosure, the aggregate is split into a plurality of aggregate fragments, and each aggregate fragment can be reduced independently, so that the parallelism is improved. The division of aggregate fragments can be determined according to the needs of the application. For example, a number of aggregate fragments can be determined according to the amount of parallel processing desired, and then the aggregates can be divided according to the number of aggregate fragments, for example, uniformly or nonuniformly. For example, the number of aggregate fragments can be equal to the number of execution workstations participating in aggregation, in which case, each execution workstation can perform reduction of one aggregate fragment at the same time, so that the parallelism of the plurality of execution workstations can be fully utilized.

For step S202, the first portion of aggregate fragments refers to aggregate fragments sent to another execution workstation and reduced on the another execution workstation. Another execution workstation refers to one or more execution workstations in the distributed computing system that are different from this execution workstation and participate in aggregation. The first portion of aggregate fragments may be one or more fragments, which are sent to another execution workstation for reduction with corresponding aggregate fragments on the another execution workstation. "A corresponding aggregate fragment" means that this aggregate fragment has a same position in its aggregate as the sent aggregate fragment has in its aggregate. In reduction, two corresponding aggregate fragments are merged and calculated as one fragment. When the first portion has a plurality of fragments, the first portion can be sent to the same other execution workstation or to different other execution workstations separately.

For step S203, the second portion of aggregate fragments refer to aggregate fragments reduced with aggregate fragments received from further another execution workstation, that is, the second portion of aggregate fragments are aggregate fragments reduced at this execution workstation. It should be noted that the further another execution workstation in step S203 may be the same as or different from the another execution workstation in step S202. In addition, when a number of aggregate fragments into which the aggregate is split is equal to a number of execution workstations participating in aggregation, the number of the first portion of aggregate fragments and the number of the second portion of aggregate fragments can be one respectively, so that all execution workstations in the distributed system can separately reduce one aggregate fragment at a time, and the parallelism of the plurality of execution workstations is fully utilized.

For step S204, a first portion of aggregate fragments and a second portion of aggregate fragments are re-determined after the sent aggregate fragments are removed, and the above steps S202 and S203 are iteratively executed until each of the plurality of aggregate fragments is sent or completes all reduction. The "all reduction" mentioned here means that the aggregate fragment has aggregated corresponding fragments of all aggregates that need to be reduced in the distributed system. For example, the distributed system has M execution workstations in total, each execution workstation has one aggregate that needs to be reduced, and in the case that a certain aggregate fragment has aggregated corresponding fragments of M aggregates of the M execution workstations, it means that this aggregate fragment has completed all reduction. Re-determination of the first portion and the second portion can be set according to the needs of the application. For example, the first portion of aggregate fragments that is re-determined in the remaining portion excluding the first portion of aggregate fragments that have been sent from the plurality of aggregate fragments can be the second portion of aggregate fragments that are updated in a previous round of reception and reduction, that is, the aggregate fragments that have been reduced are preferentially sent. For step S205, the execution workstation sends the aggregate fragments completing reduction in step S204 to the management workstation, so that the management workstation can splice all the aggregate fragments completing reduction into a result aggregate.

Figure 2B:
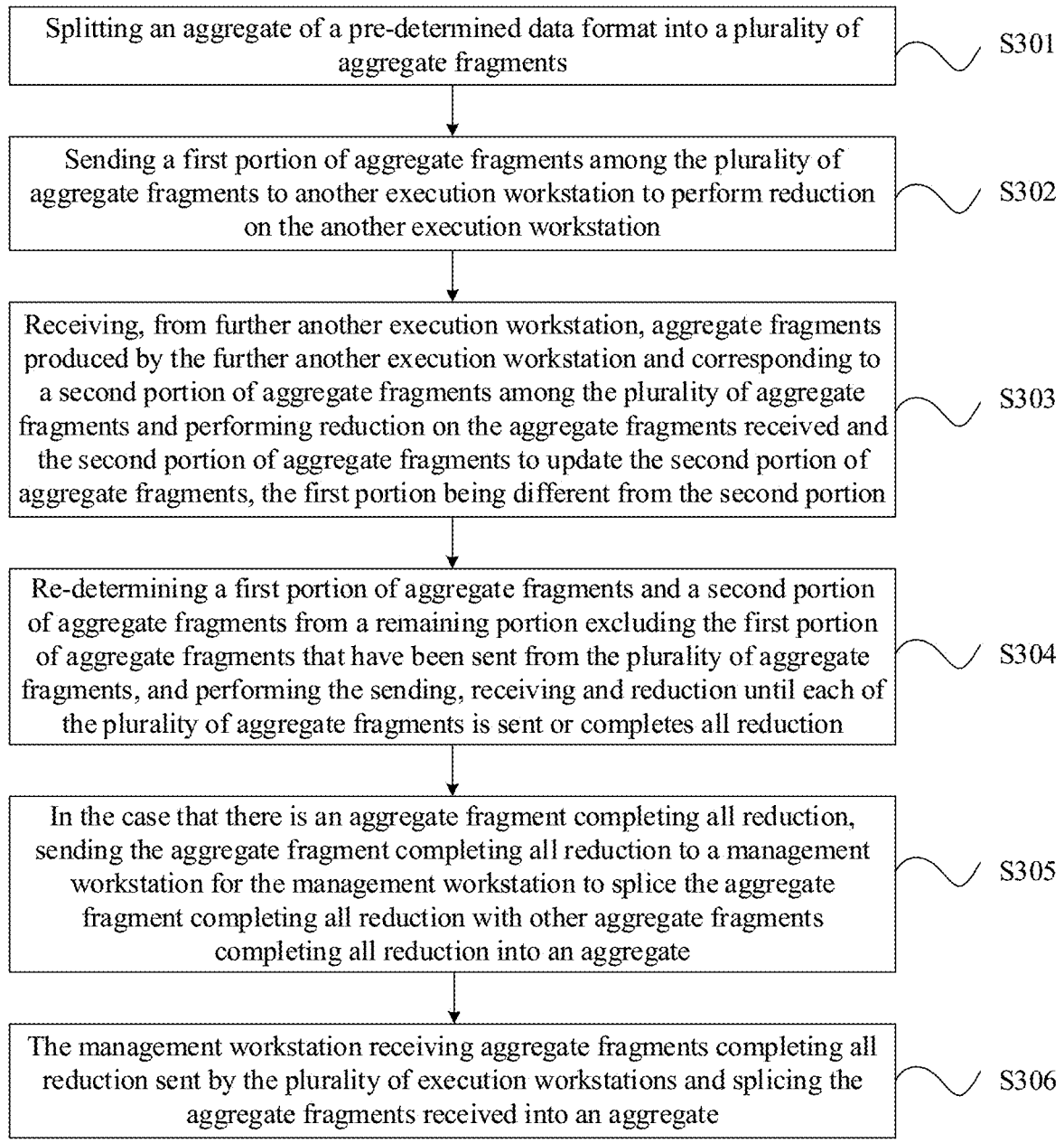
FIG. 2B shows a flowchart of a data processing method executed by a distributed computing system provided by at least one embodiment of the present disclosure.

FIG. 2B shows a flowchart of a data processing method executed by a distributed computing system provided by at least one embodiment of the present disclosure. The distributed computing system includes a management workstation and a plurality of execution workstations.

As shown in FIG. 2B, the data processing method includes steps S301 to S306.

Steps S301-S305 are executed by each execution workstation, and step S306 is executed by the management workstation.

Step S301: splitting an aggregate of a pre-determined data format into a plurality of aggregate fragments.

Step S302: sending a first portion of aggregate fragments among the plurality of aggregate fragments to another execution workstation to perform reduction on the another execution workstation.

Step S303: receiving, from further another execution workstation, aggregate fragments produced by the further another execution workstation and corresponding to a second portion of aggregate fragments among the plurality of aggregate fragments and performing reduction on the aggregate fragments received and the second portion of aggregate fragments, to update the second portion of aggregate fragments, the first portion being different from the second portion.

Step S304: re-determining a first portion of aggregate fragments and a second portion of aggregate fragments from a remaining portion excluding the first portion of aggregate fragments that have been sent from the plurality of aggregate fragments, and executing the sending, receiving and reduction until each of the plurality of aggregate fragments is sent or completes all reduction.

Step S305: in the case that there is an aggregate fragment completing all reduction, sending the aggregate fragments completing all reduction to the management workstation.

Step S306: the management workstation receiving aggregate fragments completing all reduction sent by the plurality of execution workstations and splicing the aggregate fragments received into an aggregate.

Steps S301-S305 are the same as steps S201-S205 shown in FIG. 2A, which have been described in detail above, and are omitted here.

For step S306, the management workstation receives the aggregate fragments completing all reduction, and then splices these aggregate fragments into one result aggregate.

Figure 3:
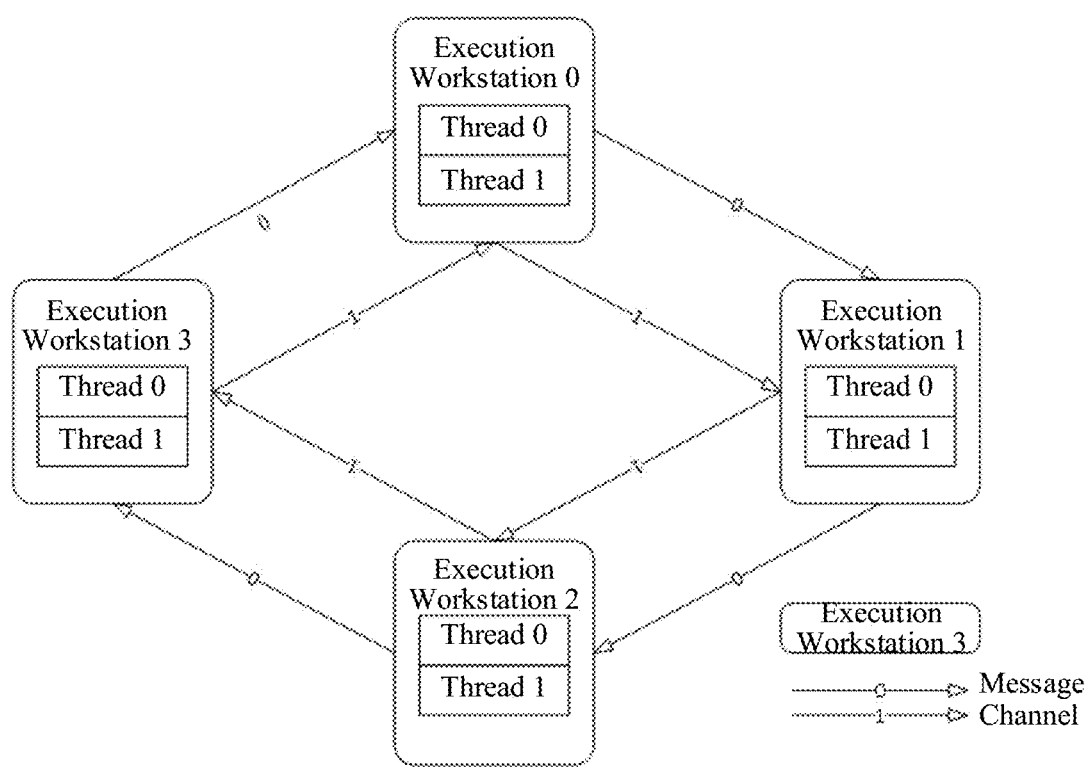
FIG. 3 shows a topological diagram of a communication infrastructure of the execution workstation provided by at least one embodiment of the present disclosure.

FIG. 3 shows a topological diagram of a communication infrastructure of the execution workstation provided by at least one embodiment of the present disclosure. It should be noted that a connection relationship between the execution workstations in FIG. 3 only represents a logical communication relationship between them, rather than an actual network connection relationship; and the actual network connection can adopt any suitable way as long as the logical communication relationship shown in FIG. 3 can be realized.

As shown in FIG. 3, for example, the distributed computing system has four execution workstations, namely, an execution workstation 0, an execution workstation 1, an execution workstation 2 and an execution workstation 3. The four execution workstations communicate in the form of parallel directional loops. Each execution workstation can send messages to its next execution workstation and receive messages from its previous workstation. For example, the execution workstation 3 sends messages to the execution workstation 0 and receives messages from the execution workstation 2. An arrow in FIG. 3 indicates a message channel, and there may be one or more parallel message channels between two adjacent execution workstations. FIG. 3 shows 2 parallel message channels (parallel communication lines), which are marked as "0" and "1" respectively.

In some embodiments of the present disclosure, the number of aggregate fragments into which the aggregate is split may be equal to the number of execution workstations participating in aggregation multiplied by a number of parallel communication lines of each execution workstation, and the number of the first portion of aggregate fragments and the number of the second portion of aggregate fragments are the number of parallel communication lines of each execution workstation, respectively. In this case, communication resources can be fully utilized to improve the parallelism.

For example, in the case shown in FIG. 3, the number of aggregate fragments into which the aggregate is split is equal to the number (namely, 4) of execution workstations participating in aggregation multiplied by a number (namely, 2) of parallel communication lines of each execution workstation, that is, the aggregate is split into 8 aggregate fragments. The number of the first portion of aggregate fragments and the number of the second portion of aggregate fragments are 2 respectively. Therefore, in each round of processing, one execution workstation can simultaneously send 2 aggregate fragments and simultaneously receive 2 aggregate fragments through 2 communication lines.

Figure 4:
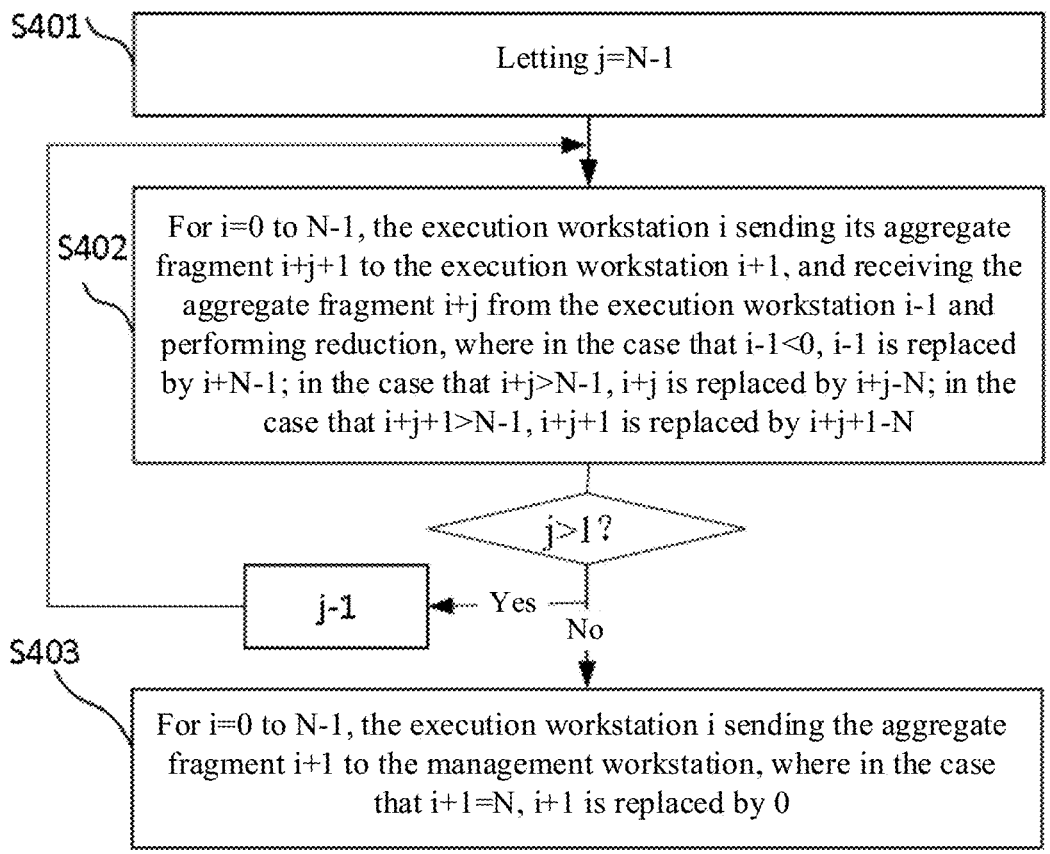
FIG. 4 shows a flowchart of sending, receiving and reducing processes performed by a plurality of execution workstations provided by at least one embodiment of the present disclosure.

FIG. 4 shows a flowchart of sending, receiving and reducing processes performed by a plurality of execution workstations provided by at least one embodiment of the present disclosure. The number of execution workstations is N, and the execution workstations are sequentially numbered as $0, 1, \ldots i, \ldots$ and $N-1$; the number of the plurality of aggregate fragments is also N, and the execution workstations are execution workstations numbered as $0, 1, \ldots i, \ldots$ and $N-1$.

As shown in FIG. 4, the method may include steps S401 to S402.

Step S401: letting $j=N-1$.

Step S402: for $i=0$ to $N-1$, the execution workstation i sending its aggregate fragment $i+j+1$ to the execution workstation $i+1$, and receiving the aggregate fragment $i+j$ from the execution workstation $i-1$ and performing reduction, where in the case that $i-1<0$, $i-1$ is replaced by $i+N-1$; in the case that $i+j>N-1$, $i+j$ is replaced by $i+j-N$; in the case that $i+j+1>N-1$, $i+j+1$ is replaced by $i+j+1-N$;

in the case that $j>1$, subtracting 1 from a value of j and performing step S402.

Step S403: for $i=0$ to $N-1$, the execution workstation i sending the aggregate fragment $i+1$ to the management workstation, where in the case that $i+1=N$, $i+1$ is replaced by 0.

For example, $N=4$, that is, the number of execution workstations is 4, and the number of the plurality of aggregate fragments is 4. Let $j=N-1=3$.

In a first round of iteration, for the execution workstation 0, let $i-1=i+N-1=3$ because $i-1<0$, and let $i+j+1=i+j+1-N=0$ because $i+j+1>N-1$; and the execution workstation 0 sends its aggregate fragment 0 to the execution workstation 1, and receives the aggregate fragment 3 from the execution workstation 3 and performs reduction. For the execution workstation 1, let $i+j=i+j-N=0$ because $i+j=1+3>3$, and let $i+j+1=i+j+1-N=1$ because $i+j+1>N-1$; and the execution workstation 1 sends its aggregate fragment 1 to the execution workstation 2, and receives the aggregate fragment 0 from the execution workstation 0 and performs reduction. For the execution workstation 2, let $i+j=i+j-N=1$ because $i+j=2+3>3$, and let $i+j+1=i+j+1-N=2$ because $i+j+1>N-1$; and the execution workstation 2 sends its aggregate fragment 2 to the execution workstation 3, and receives the aggregate fragment 1 from the execution workstation 1 and performs reduction. For the execution workstation 3, let $i+j=i+j-N=2$ because $i+j=3+3>3$, and let $i+j+1=i+j+1-N=3$ because $i+j+1>N-1$, and the execution workstation 3 sends its aggregate fragment 3 to the execution workstation 0, and receives the aggregate fragment 2 from the execution workstation 2 and performs reduction. Because $j=3>1$, the value of j is decremented by 1, at which time $j=2$, and a second round of iteration is performed.

In the second round of iteration, for the execution workstation 0, let $i-1=i+N-1=3$ because $i-1<0$, and the execution workstation 0 sends its aggregate fragment 3 to the execution workstation 1, and receives the aggregate fragment 2 from the execution workstation 3 and performs reduction. For the execution workstation 1, the execution workstation 1 sends its aggregate fragment 0 to the execution workstation 2, and receives the aggregate fragment 3 from the execution workstation 0 and performs reduction. For the execution workstation 2, the execution workstation 2 sends its aggregate fragment 1 to the execution workstation 3, and receives the aggregate fragment 0 from the execution workstation 1 and performs reduction. For the execution workstation 3, the execution workstation 3 sends its aggregate fragment 2 to the execution workstation 0, and receives the aggregate fragment 1 from the execution workstation 2 and performs reduction. Because $j=2>1$, the value of j is decremented by 1, at which time $j=1$, and a third round of iteration is performed.

In the third round of iteration, for the execution workstation 0, let $i-1=i+N-1=3$ because $i-1<0$, and the execution workstation 0 sends its aggregate fragment 2 to the execution workstation 1, and receives the aggregate fragment 1 from the execution workstation 3 and performs reduction. For the execution workstation 1, the execution workstation 1 sends its aggregate fragment 3 to the execution workstation 2, and receives the aggregate fragment 2 from the execution workstation 0 and performs reduction. For the execution workstation 2, let $i+j+1=i+j+1-N=0$ because $i+j+1>N-1$, and the execution workstation 2 sends its aggregate fragment 0 to the execution workstation 3, and receives the aggregate fragment 3 from the execution workstation 1 and performs reduction. For the execution workstation 3, let $i+j-i+j-N=0$ because $i+j=3+1>3$, and let $i+j+1=i+j+1-N=1$ because $i+j+1>N-1$; and the execution workstation 3 sends its aggregate fragment 1 to the execution workstation 0, and receives the aggregate fragment 0 from the execution workstation 2 and performs reduction. Because $j=1$, the loop ends and proceeds to step S403.

In step S403, the execution workstation 0 sends the aggregate fragment 1 to the management workstation, the execution workstation 1 sends the aggregate fragment 2 to the management workstation, and the execution workstation 2 sends the aggregate fragment 3 to the management workstation. For the execution workstation 3, because $i+1=N$, then $i+1=0$, and the execution workstation 3 sends the aggregate fragment 0 to the management workstation.

Figure 5:
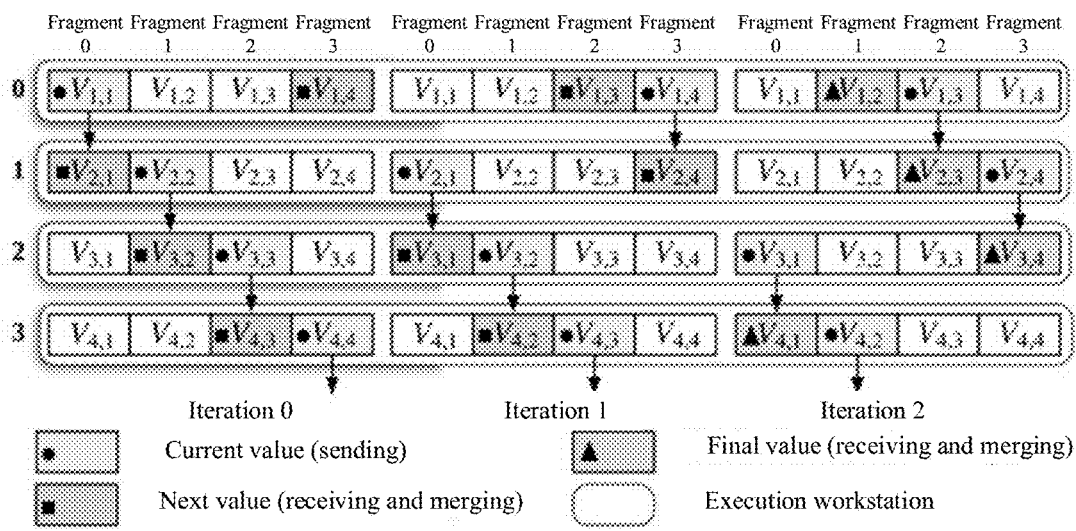
FIG. 5 shows a schematic diagram of an algorithm provided in FIG. 4 when a number of execution workstations is 4.

FIG. 5 shows a schematic diagram of an algorithm provided in FIG. 4 when a number of execution workstations is 4.

As shown in FIG. 5, 4 rounded rectangles represent 4 execution workstations, and the numbers 0, 1, 2 and 3 on left sides of the rounded rectangles represent the serial numbers of the execution workstations. Each execution workstation splits an aggregate into 4 fragments, which are represented by a fragment 0, a fragment 1, a fragment 2 and a fragment 3. A rectangle marked with a circular symbol represents a current value to be sent; a rectangle marked with a square symbol represents a next value of receiving and merging the aggregate fragment from another execution workstation; and a rectangle marked with a triangular symbol represents a final value of receiving and merging the aggregate fragment from another execution workstation. In the first round of iteration (iteration 0), the execution workstation 0 sends its aggregate fragment 0 to the execution workstation 1 and receives the aggregate fragment 3 from the execution workstation 3; the execution workstation 1 sends its aggregate fragment 1 to the execution workstation 2 and receives the aggregate fragment 0 from the execution workstation 0; the execution workstation 2 sends its aggregate fragment 2 to the execution workstation 3 and receives the aggregate fragment 1 from the execution workstation 1; and the execution workstation 3 sends its aggregate fragment 3 to the execution workstation 0 and receives the aggregate fragment 2 from the execution workstation 2. In the second round of iteration (iteration 1), the execution workstation 0 sends its aggregate fragment 3 to the execution workstation 1 and receives the aggregate fragment 2 from the execution workstation 3; the execution workstation 1 sends its aggregate fragment 0 to the execution workstation 2 and receives the aggregate fragment 3 from the execution workstation 0; the execution workstation 2 sends its aggregate fragment 1 to the execution workstation 3 and receives the aggregate fragment 0 from the execution workstation 1; and the execution workstation 3 sends its aggregate fragment 2 to the execution workstation 0 and receives the aggregate fragment 1 from the execution workstation 2. In the third round of iteration (iteration 2), the execution workstation 0 sends its aggregate fragment 2 to the execution workstation 1 and performs merging to form a final value, and receives the aggregate fragment 1 from the execution workstation 3 and merges it with the current value to form a final value; the execution workstation 1 sends its aggregate fragment 3 to the execution workstation 2 and performs merging to form a final value, and receives the aggregate fragment 2 from the execution workstation 0 and merges it with the current value to form a final value; the execution workstation 2 sends its aggregate fragment 0 to the execution workstation 3 and performs merging to form a final value, and receives the aggregate fragment 3 from the execution workstation 1 and merges it with the current value to form a final value; and the execution workstation 3 sends its aggregate fragment 1 to the execution workstation 0 and performs merging to form a final value, and receives the aggregate fragment 0 from the execution workstation 2 and merges it with the current value to form a final value.

Figure 6:
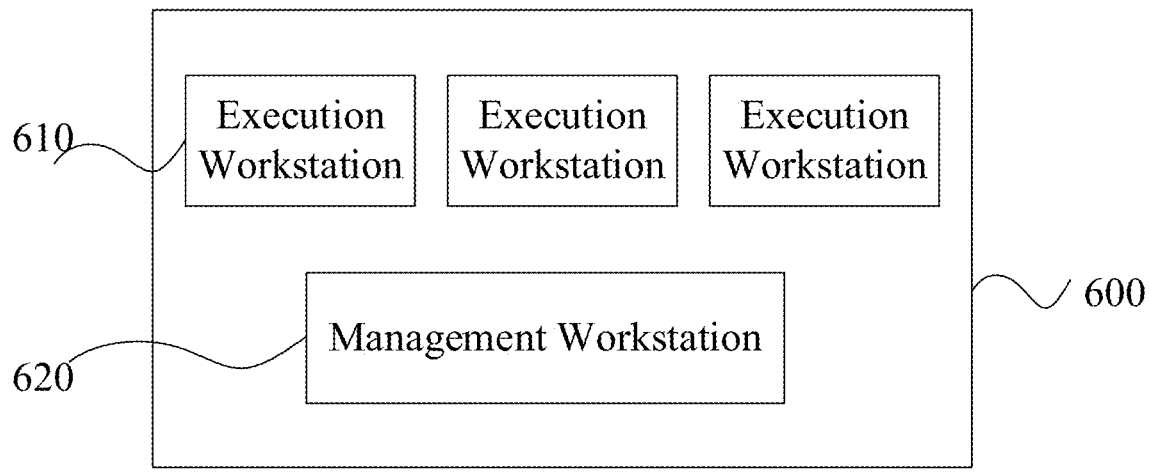
FIG. 6 shows a schematic block diagram of a distributed computing system provided by at least one embodiment of the present disclosure.

FIG. 6 shows a schematic block diagram of a distributed computing system provided by at least one embodiment of the present disclosure.

The distributed computing system 600 includes a plurality of execution workstations 610 and a management workstation 620.

Each of the plurality of execution workstations 610 is configured to: split an aggregate of a pre-determined data format into a plurality of aggregate fragments; send a first portion of aggregate fragments among the plurality of aggregate fragments to another execution workstation to perform reduction on the another execution workstation; receive, from further another execution workstation, aggregate fragments produced by the further another execution workstation and corresponding to a second portion of aggregate fragments among the plurality of aggregate fragments and performing reduction on the aggregate fragments received and the second portion of aggregate fragments to update the second portion of aggregate fragments, the first portion being different from the second portion; re-determine a first portion of aggregate fragments and a second portion of aggregate fragments from a remaining portion excluding the first portion of aggregate fragments that have been sent from the plurality of aggregate fragments, and perform the sending, receiving and reduction until each of the plurality of aggregate fragments is sent or completes all reduction; and in the case that there is an aggregate fragment completing all reduction, send the aggregate fragment completing all reduction to the management workstation.

The execution workstation 610 may, for example, execute steps S301-S305 described in FIG. 2B.

The management workstation 620 is configured to receive aggregate fragments completing all reduction sent by the plurality of execution workstations and, and splice the aggregate fragments received into an aggregate.

The management workstation 620 may, for example, execute step S306 described in FIG. 2B.

For example, the execution workstation 610 and the management workstation 620 may be implemented as hardware, software, firmware and any feasible combination thereof. For example, the execution workstation 610 and the management workstation 620 may be dedicated or universal circuits, chips or devices, etc., or may also be a combination of a processor and a memory. The embodiment of the present disclosure does not limit the specific implementation forms of the above modules.

It should be noted that in the embodiment of the present disclosure, the modules used for the distributed computing system 600 correspond to the steps of the aforementioned data processing method, and the specific functions of the distributed computing system 600 may refer to relevant description of the data processing method, which is omitted here. The components and structures for the distributed computing system 600 shown in FIG. 6 are exemplary only, not intended to be limiting, and the distributed computing system 600 may also include other components and structures as required.

At least one embodiment of the present disclosure also provides an execution workstation for distributed computing. The execution workstation for distributed computing includes a processor and a memory, the memory includes one or more computer program modules. The one or more computer program modules are stored in the memory and configured to be executed by the processor, and the one or more computer program modules include instructions for implementing the data processing method described above. The execution workstation for distributed computing can split an object to be reduced into small blocks to obtain higher parallelism, thus improving the processing performance, and thus being applicable to the scalable reduction algorithm.

Figure 7:
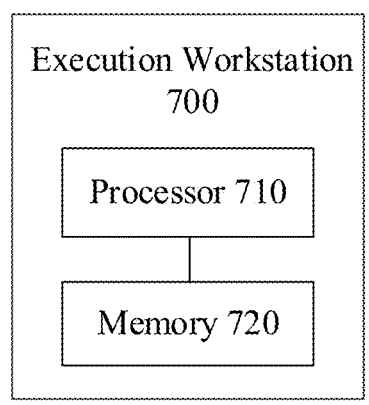
FIG. 7 shows a schematic block diagram of an execution workstation for distributed computing provided by at least one embodiment of the present disclosure.

FIG. 7 shows a schematic block diagram of an execution workstation 700 for distributed computing provided by at least one embodiment of the present disclosure. As shown in FIG. 7, the execution workstation 700 for distributed computing includes a processor 710 and a memory 720. The memory 720 is configured to store non-transitory computer-readable instructions (for example, one or more computer program modules). The processor 710 is configured to run the non-transitory computer-readable instructions. The non-transitory computer-readable instructions when executed by the processor 710, can execute one or more steps of the data processing method described above. The memory 720 and the processor 710 may be interconnected by a bus system and/or other forms of connection mechanisms (not shown).

For example, the processor 710 may be a central processing unit (CPU), a graphic processing unit (GPU) or other forms of processing units with data processing capability and/or program execution capability. For example, the central processing unit (CPU) may be an X86 or ARM architecture or the like. The processor 710 may be a general-purpose processor or a dedicated processor, and may control other components in the execution workstation 700 for distributed computing to perform desired functions.

For example, the memory 720 may include any combination of one or more computer program products, and the computer program product may include various forms of computer-readable storage media, such as a volatile memory and/or a nonvolatile memory. The volatile memory may include, for example, a random access memory (RAM) and/or a cache, etc. The nonvolatile memory may include, for example, a read-only memory (ROM), a hard disk, an erasable programmable read-only memory (EPROM), a portable compact disk read-only memory (CD-ROM), a USB memory, a flash memory, etc. One or more computer program modules may be stored on a computer-readable storage medium, and the processor 710 may run one or more computer program modules to implement various functions of the execution workstation 700 for distributed computing. The computer-readable storage medium may also store various application programs and various data, as well as various data used and/or generated by the application programs, etc.

It should be noted that in the embodiment of the present disclosure, the specific functions and technical effects of the execution workstation 700 for distributed computing may refer to the above description of the data processing method, which is omitted here.

At least one embodiment of the present disclosure also provides a computer-readable storage medium for storing non-transitory computer-readable instructions. The non-transitory computer-readable instructions, when executed by a computer, can implement the data processing method described above. Using this computer-readable storage medium, the object to be reduced can be split into small blocks to obtain more parallelism, so that the scalability of reduction is improved.

Figure 8:
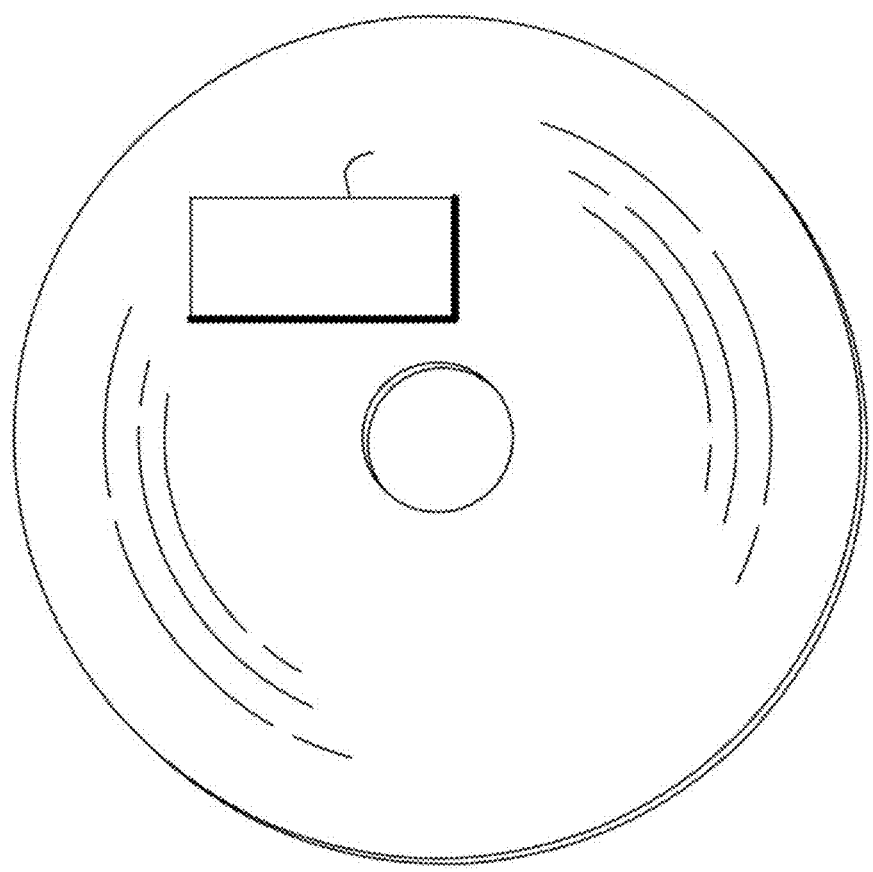
FIG. 8 shows a schematic diagram of a computer-readable storage medium provided by at least one embodiment of the present disclosure.

FIG. 8 is a schematic diagram of a storage medium provided by some embodiments of the present disclosure. As shown in FIG. 8, the storage medium 800 is configured to store non-transitory computer-readable instructions 810. For example, the non-transitory computer-readable instructions 810, when executed by a computer, can execute one or more steps in the data processing method described above.

For example, the storage medium 800 can be applied to the aforementioned execution workstation 700 for distributed computing. For example, the storage medium 800 may be the memory 720 in the execution workstation 700 for distributed computing shown in FIG. 7. For example, the description of the storage medium 800 may refer to the corresponding description of the memory 720 in the execution workstation 700 for distributed computing shown in FIG. 7, which is omitted here. It should be noted that the drawings of the embodiments of the present disclosure only relate to structures related to the embodiments of the present disclosure, and other structures may refer to general designs. In case of no conflict, the embodiments of the present disclosure and features in the embodiments can be combined with each other to obtain a new embodiment.

The above description is only a specific embodiment of the present disclosure, but the scope of the present disclosure is not limited thereto, and the scope of the present disclosure should be subject to the scope of the claims.

The invention claimed is:

1. A data processing method for distributed computing executed by an execution workstation, comprising:
splitting an aggregate of a pre-determined data format into a plurality of aggregate fragments;

sending a first portion of aggregate fragments among the plurality of aggregate fragments to a first execution workstation to perform reduction on the first execution workstation;

receiving, from a second execution workstation, aggregate fragments produced by the second execution workstation and corresponding to a second portion of aggregate fragments among the plurality of aggregate fragments and performing reduction on the aggregate fragments received and the second portion of aggregate fragments to update the second portion of aggregate fragments, wherein the first portion is different from the second portion;

re-determining a new first portion of aggregate fragments and a new second portion of aggregate fragments from a remaining portion excluding the first portion of aggregate fragments that have been sent from the plurality of aggregate fragments, and performing the sending, receiving and reduction until each of the plurality of aggregate fragments is sent or completes all reduction; and in a case that there is an aggregate fragment completing all reduction, sending the aggregate fragment completing all reduction to a management workstation for the management workstation to splice the aggregate fragment completing all reduction with other aggregate fragments completing all reduction into an aggregate.

2. The data processing method according to claim 1, wherein
a number of aggregate fragments into which the aggregate is split is equal to a number of execution workstations participating in aggregation; and
a number of the first portion of aggregate fragments and a number of the second portion of aggregate fragments are one respectively.

3. The data processing method according to claim 1, wherein
a number of aggregate fragments into which the aggregate is split is equal to a number of execution workstations participating in aggregation multiplied by a number of parallel communication lines of each of the execution workstations; and
a number of the first portion of aggregate fragments and a number of the second portion of aggregate fragments are respectively the number of parallel communication lines of each of the execution workstations.

4. The data processing method according to claim 1, wherein
the new first portion of aggregate fragments which is re-determined in the remaining portion excluding the first portion of aggregate fragments that have been sent from the plurality of aggregate fragments is the second portion of aggregate fragments which is updated in a previous round of receiving and reduction.

5. An execution workstation for distributed computing, comprising at least one processor and at least one memory, wherein the at least one memory stores one or more computer program instructions, the one or more computer program instructions upon being executed by the at least one processor, implement the data processing method according to claim 1.

6. A data processing method executed by a distributed computing system, the distributed computing system comprising a plurality of execution workstations and a management workstation, wherein the data processing method comprises:

each of the plurality of execution workstations executing following steps:

splitting an aggregate of a pre-determined data format into a plurality of aggregate fragments;

sending a first portion of aggregate fragments among the plurality of aggregate fragments to a first execution workstation of the plurality of execution workstations to perform reduction on the first execution workstation;

receiving, from a second execution workstation of the plurality of execution workstations, aggregate fragments produced by the second execution workstation and corresponding to a second portion of aggregate fragments among the plurality of aggregate fragments and performing reduction on the aggregate fragments received and the second portion of aggregate fragments, to update the second portion of aggregate fragments, wherein the first portion is different from the second portion;

re-determining a new first portion of aggregate fragments and a new second portion of aggregate fragments from a remaining portion excluding the first portion of aggregate fragments that have been sent from the plurality of aggregate fragments, and executing the sending, receiving and reduction until each of the plurality of aggregate fragments is sent or completes all reduction; and in a case that there is an aggregate fragment completing all reduction, sending the aggregate fragments completing all reduction to the management workstation; and the management workstation receiving aggregate fragments completing all reduction sent by the plurality of execution workstations and splicing the aggregate fragments received into an aggregate.

7. The data processing method according to claim 6, wherein
a number of aggregate fragments into which the aggregate is split is equal to a number of the plurality of execution workstations; and
a number of the first portion of aggregate fragments and a number of the second portion of aggregate fragments are one respectively.

8. The data processing method according to claim 6, wherein
a number of the plurality of execution workstations is N, and the plurality of execution workstations are sequentially numbered as 0, 1, . . . i, . . . and N−1;
a number of the plurality of aggregate fragments is N, and the plurality of aggregate fragments are sequentially numbered as 0, 1, . . . i, . . . and N−1;
the plurality of execution workstations perform the sending, receiving and reduction as follows:
step one: letting j=N−1;
step two: for i=0 to N−1, an i-th execution workstation sending a (i+j+1)-th aggregate fragment of the i-th execution workstation to an (i+1)-th execution workstation, and receiving an (i+j)-th aggregate fragment from an (i−1)-th execution workstation and performing reduction, wherein in a case that i−1<0, i−1 is replaced by i+N−1; in a case that i+j>N−1, i+j is replaced by i+j−N; in a case that i+j+1>N−1, i+j+1 is replaced by i+j+1−N;
in a case that j>1, subtracting 1 from a value of j and performing the step two; and
step three: for i=0 to N−1, the i-th execution workstation sending an (i+1)-th aggregate fragment to the management workstation, wherein in a case that i+1=n, i+1 is replaced by 0.

9. The data processing method according to claim 6, wherein
a number of aggregate fragments into which the aggregate is split is equal to a number of the plurality of execution workstations multiplied by a number of parallel communication lines of each of the plurality of execution workstations; and
a number of the first portion of aggregate fragments and a number of the second portion of aggregate fragments are respectively the number of parallel communication lines of each of the plurality of execution workstations.

10. A distributed computing system comprising a plurality of execution workstations and a management workstation, wherein
each of the plurality of execution workstations comprises at least one processor and at least one memory, wherein the at least one memory stores one or more computer program instructions, the one or more computer program instructions upon being executed by the at least one processor, implement following steps:
splitting an aggregate of a pre-determined data format into a plurality of aggregate fragments;
sending a first portion of aggregate fragments among the plurality of aggregate fragments to a first execution workstation of the plurality of execution workstations to perform reduction on the first execution workstation;
receiving, from a second execution workstation of the plurality of execution workstations, aggregate fragments produced by the second execution workstation and corresponding to a second portion of aggregate fragments among the plurality of aggregate fragments and perform reduction on the aggregate fragments received and the second portion of aggregate fragments to update the second portion of aggregate fragments, wherein the first portion is different from the second portion;
re-determining a new first portion of aggregate fragments and a new second portion of aggregate fragments from a remaining portion excluding the first portion of aggregate fragments that have been sent from the plurality of aggregate fragments, and perform the sending, receiving and reduction until each of the plurality of aggregate fragments is sent or completes all reduction; and
in a case that there is an aggregate fragment completing all reduction, sending the aggregate fragment completing all reduction to the management workstation; and
the management workstation is configured to receive aggregate fragments completing all reduction sent by the plurality of execution workstations, and splice the aggregate fragments received into an aggregate.

11. A non-transitory computer-readable storage medium, non-temporarily storing computer-readable instructions, wherein the computer-readable instructions, upon being executed by a processor, implement the data processing method according to claim 1.

12. The data processing method according to claim 2, wherein
the new first portion of aggregate fragments which is re-determined in the remaining portion excluding the first portion of aggregate fragments that have been sent from the plurality of aggregate fragments is the second portion of aggregate fragments which is updated in a previous round of receiving and reduction.

13. The data processing method according to claim 3, wherein
the new first portion of aggregate fragments which is re-determined in the remaining portion excluding the first portion of aggregate fragments that have been sent from the plurality of aggregate fragments is the second portion of aggregate fragments which is updated in a previous round of receiving and reduction.

14. The data processing method according to claim 7, wherein
a number of the plurality of execution workstations is N, and the plurality of execution workstations are sequentially numbered as 0, 1, . . . i, . . . and N−1;
a number of the plurality of aggregate fragments is N, and the plurality of aggregate fragments are sequentially numbered as 0, 1, . . . i, . . . and N−1;
the plurality of execution workstations perform the sending, receiving and reduction as follows:
step one: letting j=N−1;
step two: for i=0 to N−1, an i-th execution workstation sending a (i+j+1)-th aggregate fragment of the i-th execution workstation to an (i+1)-th execution workstation, and receiving an (i+j)-th aggregate fragment from an (i−1)-th execution workstation and performing reduction, wherein in a case that i−1<0, i−1 is replaced by i+N−1; in a case that i+j>N−1, i+j is replaced by i+j−N; in a case that i+j+1>N−1, i+j+1 is replaced by i+j+1−N;
in a case that j>1, subtracting 1 from a value of j and performing the step two; and
step three: for i=0 to N−1, the i-th execution workstation sending an (i+1)-th aggregate fragment to the management workstation, wherein in a case that i+1=n, i+1 is replaced by 0.

15. The data processing method according to claim 7, wherein
a number of aggregate fragments into which the aggregate is split is equal to a number of the plurality of execution workstations multiplied by a number of parallel communication lines of each of the plurality of execution workstations; and
a number of the first portion of aggregate fragments and a number of the second portion of aggregate fragments are respectively the number of parallel communication lines of each of the plurality of execution workstations.

16. The data processing method according to claim 8, wherein
a number of aggregate fragments into which the aggregate is split is equal to a number of the plurality of execution workstations multiplied by a number of parallel communication lines of each of the plurality of execution workstations; and
a number of the first portion of aggregate fragments and a number of the second portion of aggregate fragments are respectively the number of parallel communication lines of each of the plurality of execution workstations.

17. The distributed computing system according to claim 10, wherein
a number of aggregate fragments into which the aggregate is split is equal to a number of execution workstations participating in aggregation; and
a number of the first portion of aggregate fragments and a number of the second portion of aggregate fragments are one respectively.

18. The distributed computing system according to claim 10, wherein
- a number of aggregate fragments into which the aggregate is split is equal to a number of execution workstations participating in aggregation multiplied by a number of parallel communication lines of each of the execution workstations; and
- a number of the first portion of aggregate fragments and a number of the second portion of aggregate fragments are respectively the number of parallel communication lines of each of the execution workstations.

19. The distributed computing system according to claim 10, wherein
- the new first portion of aggregate fragments which is re-determined in the remaining portion excluding the first portion of aggregate fragments that have been sent from the plurality of aggregate fragments is the second portion of aggregate fragments which is updated in a previous round of receiving and reduction.

20. The distributed computing system according to claim 17, wherein
- the new first portion of aggregate fragments which is re-determined in the remaining portion excluding the first portion of aggregate fragments that have been sent from the plurality of aggregate fragments is the second portion of aggregate fragments which is updated in a previous round of receiving and reduction.

\* \* \* \* \*